(12) United States Patent
Muaffak

(10) Patent No.: US 12,100,314 B2
(45) Date of Patent: Sep. 24, 2024

(54) AIDING DEVICE FOR SINGING ON PITCH

(71) Applicant: Dunya Muaffak, Burnaby (CA)

(72) Inventor: Dunya Muaffak, Burnaby (CA)

(73) Assignee: Dunya Muaffak, Burnaby (CA)

( * ) Notice: Subject to any disclaimer, the term of this patent is extended or adjusted under 35 U.S.C. 154(b) by 247 days.

(21) Appl. No.: 17/818,697

(22) Filed: Aug. 9, 2022

(65) Prior Publication Data

US 2023/0047749 A1 Feb. 16, 2023

Related U.S. Application Data

(60) Provisional application No. 63/231,323, filed on Aug. 10, 2021.

(51) Int. Cl.
| | | |
|---|---|---|
| *G09B 5/04* | (2006.01) | |
| *G09B 15/00* | (2006.01) | |
| *G10G 7/00* | (2006.01) | |
| *G10H 1/00* | (2006.01) | |
| *H04R 1/08* | (2006.01) | |
| *H04R 1/10* | (2006.01) | |
| *H04R 3/00* | (2006.01) | |

(52) U.S. Cl.
CPC ............... *G09B 5/04* (2013.01); *G09B 15/00* (2013.01); *G10G 7/00* (2013.01); *G10H 1/0008* (2013.01); *H04R 1/08* (2013.01); *H04R 1/1041* (2013.01); *H04R 3/00* (2013.01); *G10H 2210/066* (2013.01); *G10H 2220/005* (2013.01); *H04R 2420/07* (2013.01)

(58) Field of Classification Search
CPC .............................. H04R 1/1041; H04R 3/00
See application file for complete search history.

(56) References Cited

U.S. PATENT DOCUMENTS

| | | | | |
|---|---|---|---|---|
| 7,356,155 | B2 * | 4/2008 | Monnie .................... | H04R 1/32 381/337 |
| 8,061,473 | B1 * | 11/2011 | Kerr ...................... | H04R 1/1016 181/135 |
| 8,948,411 | B1 * | 2/2015 | Moser .................... | H04R 1/342 381/71.7 |
| 9,253,299 | B2 * | 2/2016 | Moser ................. | G10L 21/0208 |

(Continued)

*Primary Examiner* — Robert W Horn

(57) ABSTRACT

Examples of an aiding device for singers are described. The aiding device comprises a body that has a periphery edge, a top wall and a smooth inner wall. The top wall curves away from the periphery edge thus forming a cup-like cavity which is shaped to define a first chamber and a second chamber that are interconnected together. The first chamber is shaped and sized to fit over an earlobe of a singer while the second chamber has a distal end that is designed and configured to be positioned in proximity to a user's mouth. When in use the first chamber encloses one of user's ears and the distal end of the second chamber is positioned in proximity to user's mouth with the periphery edge pressed against user's face such that a sound produced by the user is captured and travels into the second and first chamber and is reflected back from the smooth inner wall producing echo within the cavity. Thus, the unfiltered sound coming out from the singer's mouth is provided to one of the singer's ear in real time and hear the original sound or key in the other ear so that the singer can match his/her pitch to the original sound.

11 Claims, 3 Drawing Sheets

(56) References Cited

U.S. PATENT DOCUMENTS

| | | | |
|---|---|---|---|
| 10,369,321 B2* | 8/2019 | Denizoglu | B65D 1/0223 |
| 11,831,797 B2* | 11/2023 | Anvari | H04M 1/19 |
| 2008/0170724 A1* | 7/2008 | Cancelmo | H04R 1/083 |
| | | | 381/104 |
| 2016/0072934 A1* | 3/2016 | Moser | H04R 1/083 |
| | | | 379/430 |
| 2016/0111079 A1* | 4/2016 | Schmucker | G10K 11/22 |
| | | | 181/20 |
| 2023/0047749 A1* | 2/2023 | Muaffak | G10G 7/02 |

* cited by examiner

AIDING DEVICE FOR SINGING ON PITCH

CROSS REFERENCE TO RELATED APPLICATIONS

This application claims priority from U.S. Patent Application No. 63/231,323 filed on Aug. 10, 2021, the entirety of which is incorporated herein by its reference.

TECHNICAL FIELD

The present disclosure generally relates to a device for aiding singers in practicing singing on pitch.

BACKGROUND

Unless otherwise indicated herein, the materials described in this section are not prior art to the claims in this application and are not admitted to be prior art by inclusion in this section.

General definition of a pitch is a quality of a sound governed by the rate of vibrations producing it or in other words the degree of highness or lowness of a tone. In music terms, pitch is the actual value of the note sung (high or low) while tone would be the thickness, or how full or shrill the note is. When a person is unable to perceive differences of musical pitch accurately, it is said that such person is "tone deaf". However, many people who are unable to sing "on pitch" are not tone deaf but rather "tone-challenged". The tone challenged persons have difficulty in perceiving the frequency of a sound (or note) and are therefore not able to sing such note, however such tonally-challenged persons can learn how to sing on pitch by proper training.

SUMMARY

In one aspect, an aiding device for singers is provided. The aiding device comprises a body that has a periphery edge, a top wall, and a smooth inner wall defining a cup-like cavity. The cup-like cavity is shaped to form a first chamber and a second chamber that are interconnected together. The first chamber is shaped and sized to fit over an earlobe of a singer while the second chamber has a distal end that is designed and configured to be positioned in proximity to a user's mouth. When the device is in use, the first chamber encloses one of user's ears and the distal end of the second chamber is positioned in proximity to user's mouth with the periphery edge pressed against user's face, such that a sound produced by the user is captured and travels into the second and first chamber and is reflected back from the smooth inner wall producing echo within the cavity.

In another aspect, a microphone is connected to the cavity configured to capture audio produced by the user singing, and a communication unit to wirelessly connect the aiding device with a distant device, such that the distant device is configured to receive the captured audio from the microphone, and record and store the received captured audio.

In yet another aspect, the distant device has a display and is programmed with instructions to process the captured audio and determine vocal pitch levels from the captured sound and display such vocal pitch levels on the display of the distant device.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

The present invention discloses an aiding device that can help a person to learn and train singing on pitch. Such device can capture and echo back a sound coming out from a person's mouth to one of person's ear providing an ability of such person to hear his/her own voice unfiltered and in real time. The ability to hear the unfiltered voice in one ear and hear a sound or key from a musical instrument in the other ear gives the brain the opportunity to match person's pitch to the sound provided by the instrument.

Figure 1:
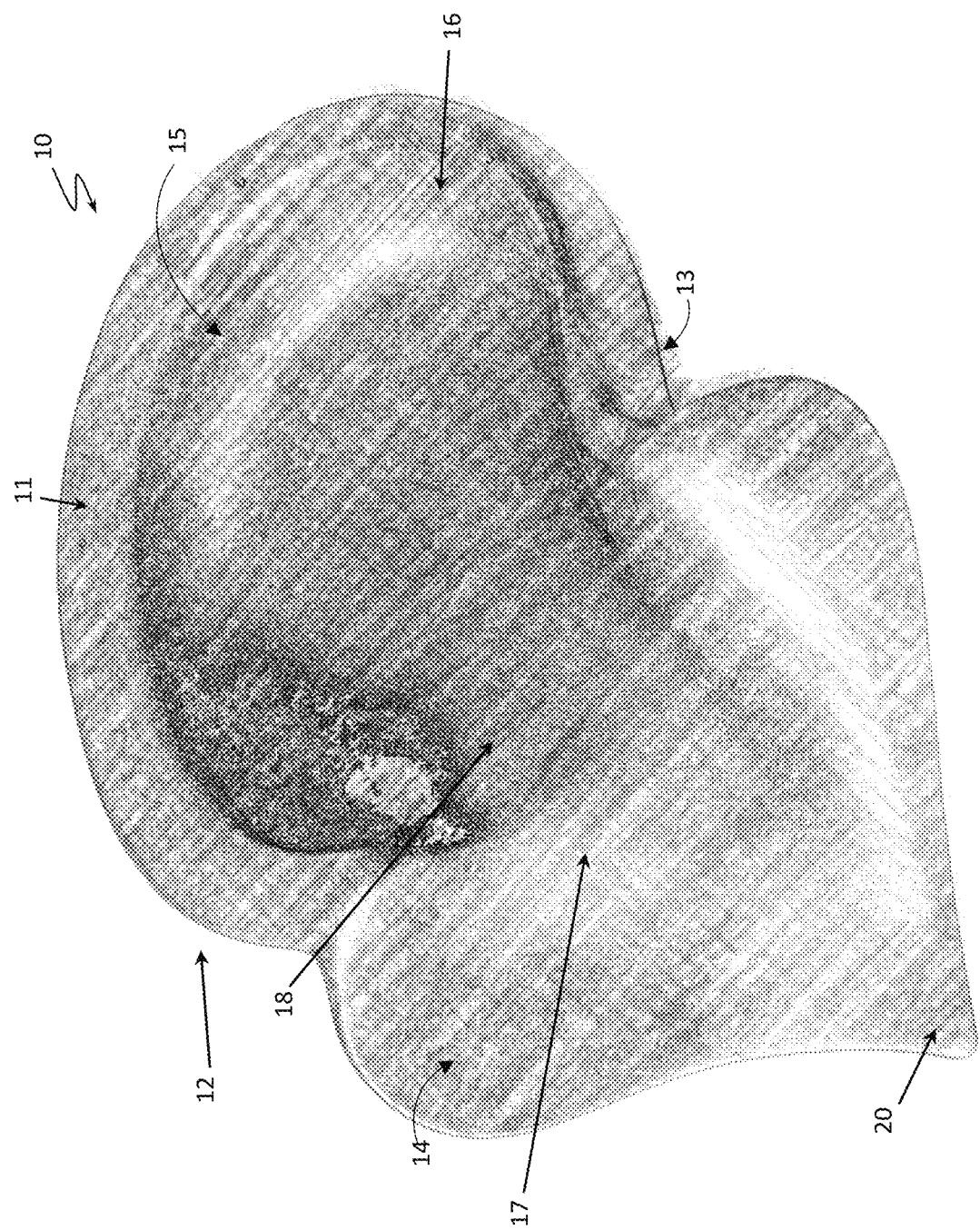
FIG. 1 is a perspective view of an inner side of an example of an aiding device for training singers.

FIG. 1 illustrates an example of the aiding device 10 that can be used for training or teaching singers to sing on pitch. The device 10 has a body 12 with a top, outside, wall 13 and a smooth inner wall 14 that is made of a material that can reflect back (bounce) the sound waves and thus creates echoes. For example, the body 12 can be made of a metal, glass, ceramic, marble, granite. In one embodiment, the body 12 of the device 10 can be made of any suitable material such as plastic, rubber, foam, wood or any combination of such materials. In some implementations, the smooth inner wall 14 can be coated with a material that reflects sound.

The body 12 has a periphery edge 11 that is shaped such that it can be firmly pressed against parts of user's face and head when in use. The top wall 13 curves away from the edge 11 forming a cup-like inner cavity 15. The cavity 15 is shaped to define a first chamber 16 and a second chamber 17 that are interconnected together. The first chamber 16 is sized and shaped to fit around an earlobe of the user, such as a singer or a person trying to learn to sing. In one embodiment, the body 12 can further comprise a narrow passage 18 formed between to connect the first and the second chambers 16, 17. The second chamber 17 has a distal end 20. When the user wants to practice singing on pitch, he or she will position the device 10 such that the first chamber 16 of the body cavity 15 fits over the earlobe of one ear so that such ear is closed within the first chamber 16. The distal end 20 of the second chamber is positioned close to user's mouth and the edge 11 is pressed against the user's face. In one embodiment, mounting straps (not shown) connected to the body 12 of the device 10 can be used to mount and secure the device to the user head, such that the first chamber 16 is secured over the earlobe of one ear and the distal end 20 of the second chamber 17 is positioned close to user's mouth, and the device can be used hands free by the user.

Figure 2:
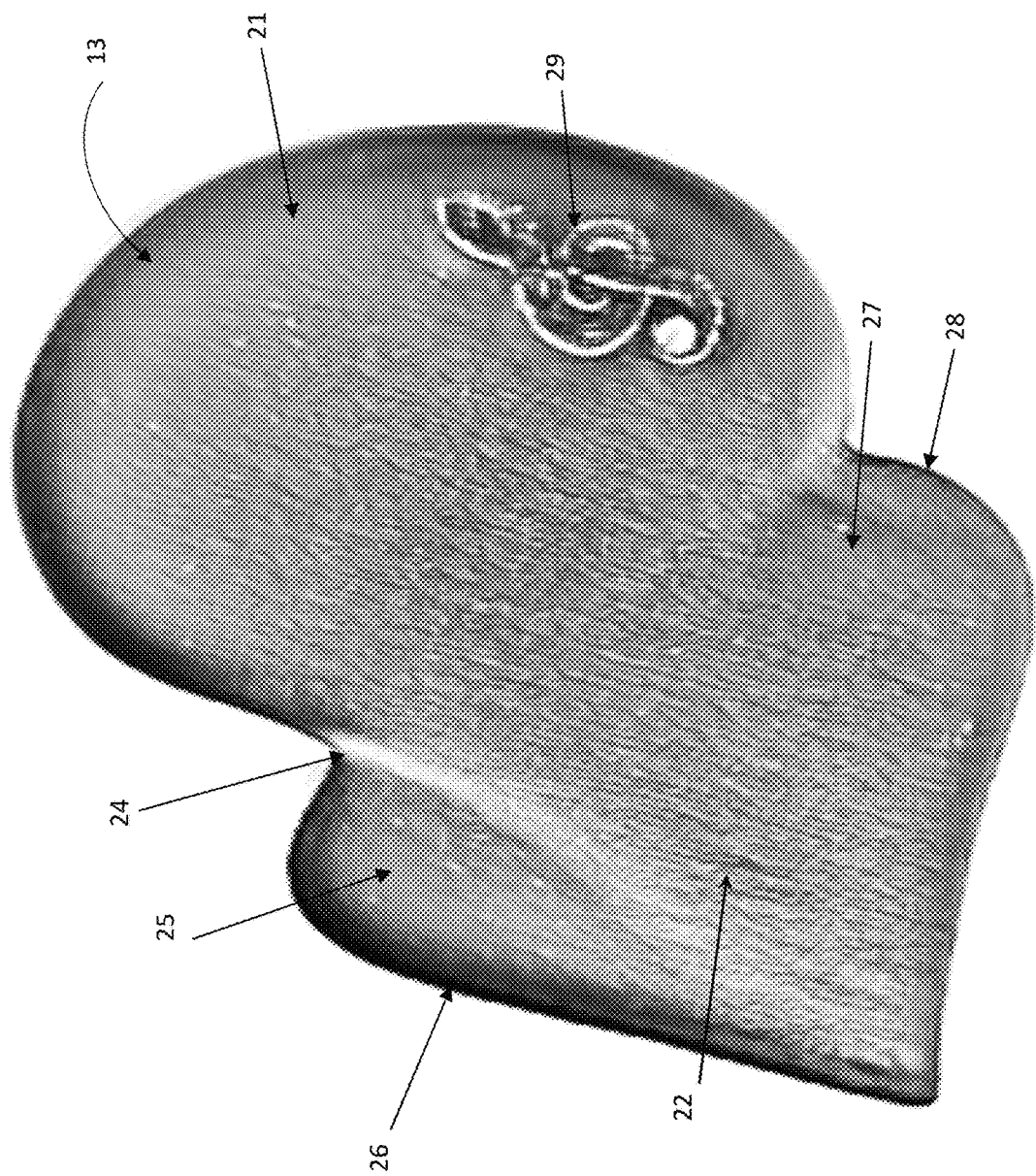
FIG. 2 is a perspective view of an outer side of the aiding device of FIG. 1.

The outside wall 13 shown in FIG. 2 is design and shaped (shell-like) with an upper part 21, a lower part 22 and a narrow (waist) part 24 therein between. In some implementations, at least one dip/vale 25 is formed in the lower part 22 under the waist 24 of the periphery edge 11. In the illustrated example, the vale 25 is formed on a first side 26 of the lower part 22 and an additional, similar dip/vale 27 is formed on a second side 28 of the lower part 22. The dips 25 and 27 can help user to have a better grip of the device when positioning and using the device during practice singing. A product name or logo 29 can be added (e.g., printed) on the top side 13 of the body 12.

When a sound is produced by the user, for example by singing a tune, it is captured through the distal end 20 traveling into the second and first chambers 17, 16 of the body's cavity 15 and is reflected back from the smooth inner wall 14 producing echo within the cavity 15. Thus, the unfiltered sound coming out from the singer's mouth is provided to one of the singer's ear in real time. An original of the same tune or key can be provided to the other ear of the user. For example, such original tune can be produced by a musical instrument and can be provided to the other ear of the singer, for example through an earphone. So, the singer can hear the unfiltered sound produced by his/her own voice in one ear and can hear the original sound or key in the other ear. This can give the user/singer an opportunity to match his/her pitch to the original sound. Using the aiding device the user can easily train his or her singing on pitch.

Figure 3:
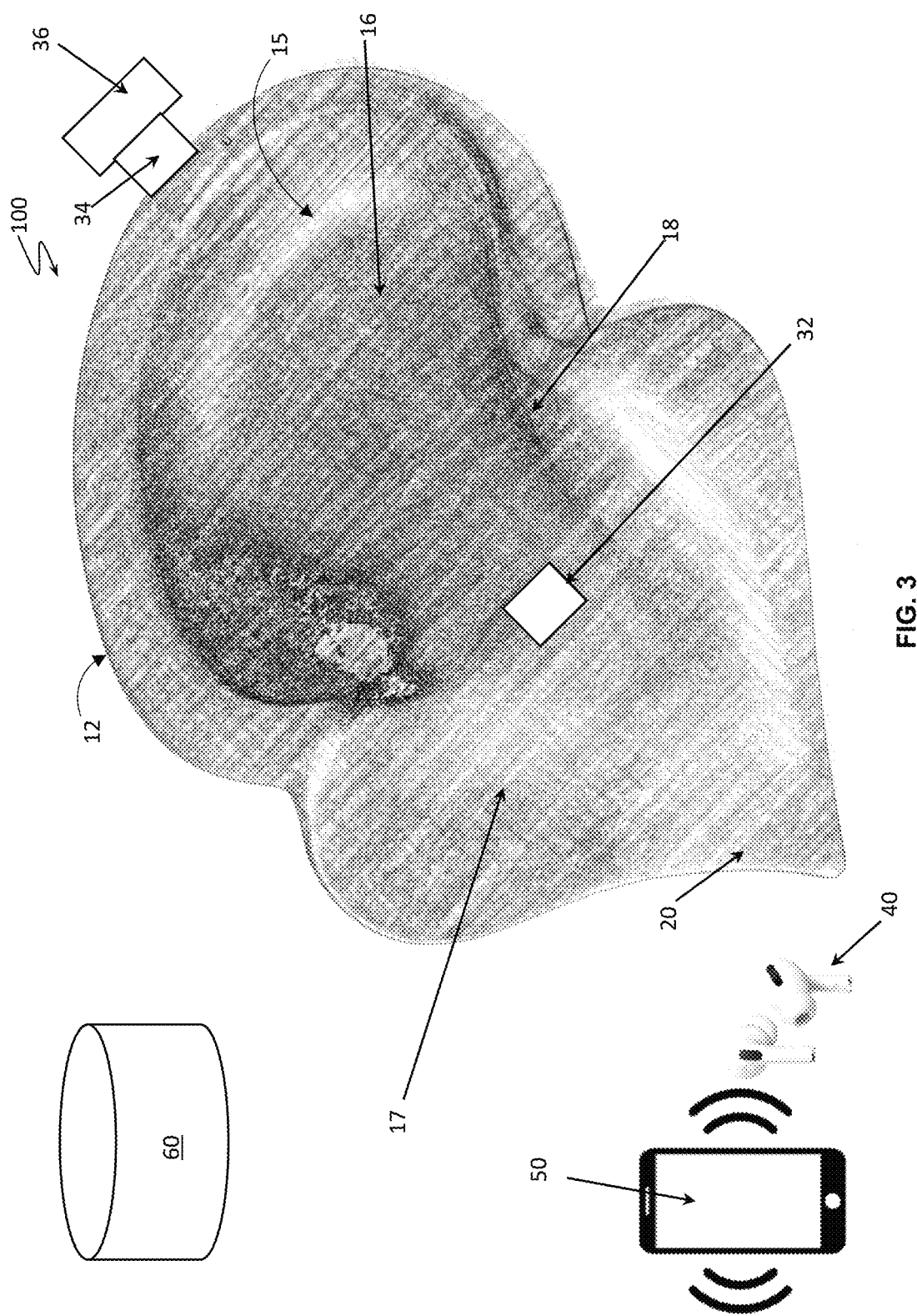
FIG. 3 is a perspective view of an inner side of another example of an aiding device for training singers.

FIG. 3 illustrates another embodiment of an aiding device 100 that can be used for training or teaching singers to sing on pitch. The device 100 is similar to the device 10 shown in FIGS. 1 and 2, and has the body 12 with the inner cavity defining the first chamber 16, the second chamber 17 with distal end 20 and the passage 18 connecting the first and the second chambers 16, 17. The device 100 further comprises a communication unit 32, a microphone 34 to capture a sound/audio of the user and a charging port 36 configured to charge a power source (i.e., a battery) to power the communication unit 34 and the microphone 32. The communication unit 32 can be a Bluetooth device that is configured to wirelessly connect the device 100 with distant devices, such as headphones or earbuds 40. The device 100 can then be positioned over one ear of the user while the earbud 40 in the other ear, so that the user can hear audio from the headphone while wearing and singing into the device 100. The microphone 32 can be attached in the device 100 for sound capture and can be wirelessly connected to a smart device 50, such as a smart phone, smart watch or a tablet. The smart device 50 can be configured to record and store the sound/audio captured by the microphone 32. An application can be installed on the smart device programmed with instructions to process the captured audio and determine vocal pitch levels from the captured sound, such that the smart device can display the vocal pitch levels on its display for user to monitor their pitch levels in real time while practicing singing or after the practice they read their vocal pitch levels using the application on the smart device. In some implementations, the smart device 50 can be in communication with a server 60 (e.g., an API server) to transmit the recorded sound/audio to the server so that the server 60 can process and determined the vocal pitch levels and transfer it to the smart phone app.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:
1. Aiding device for singers, the device comprising:
a body having a periphery edge, a top wall, a smooth inner wall defining a cup-like cavity, the cavity being shaped to form a first chamber and a second chamber, the first and the second chamber being interconnected together, the first chamber being shaped and sized to fit over an earlobe of a user, the second chamber having a distal end that is designed and configured to be positioned in proximity to a user's mouth, wherein when in use the first chamber encloses one of user's ears and the distal end of the second chamber is positioned in proximity to user's mouth with the periphery edge pressing against part of user face, and wherein a sound produced by the user is captured through the distal end and travels into the second and first chamber and is reflected back from the smooth inner wall producing echo sound within the cavity.

2. The aiding device of claim 1, further comprising a narrow passage formed between to connect the first chamber and the second chamber.

3. The adding device of claim 1 further comprises a microphone connected to the cavity and configured to capture audio produced by the user singing and a communication unit to wirelessly connect the aiding device with a distant device.

4. The aiding device of claim 3, wherein the distant device is a headphone or earbuds to enable user to hear captured audio in one ear while singing into the device that is positioned on the other ear.

5. The aiding device of claim 3, wherein the distant device is a smart device having a display and configured to receive the captured audio from the microphone, and record and store the received captured audio.

6. The aiding device of claim 5, wherein the smart device is programmed with instructions to process the captured audio and determine vocal pitch levels from the captured sound and display such vocal pitch levels on the display of the smart device.

7. The aiding device of claim 5, further comprising a server in communication with the smart device, the server programmed with instructions to process the captured audio and determine vocal pitch levels from the captured sound and transmit the vocal pitch level signals back to the smart device for display them on the display of the smart device.

8. The aiding device of claim 3, wherein the communication unit wirelessly connects the aiding device with multiple distant devices, one of the distant device being a headphone or earbuds configured to enable user to hear captured audio in one ear, and another distant device being a smart device having a display and configured to record and store the captured audio.

9. The aiding device of claim 8, wherein the smart device is programmed with instructions to process the captured audio and determine vocal pitch levels from the captured sound and display such vocal pitch levels on the display of the smart device.

10. A system for aiding singers practicing singing on pitch, the system comprises:
   a body having a periphery edge, a top wall a smooth inner wall defining a cup-like cavity, the cavity being shaped to form a first chamber and a second chamber, the first and the second chamber being interconnected together, the first chamber being shaped and sized to fit over an earlobe of a user, the second chamber having a distal end that is designed and configured to be positioned in proximity to a user's mouth;
   a microphone connected to the cavity and configured to capture audio produced by the user singing, and
   a communication unit to wirelessly connect the aiding device with a distant device,
   wherein when in use the first chamber encloses one of user's ears and the distal end of the second chamber is positioned in proximity to user's mouth with the periphery edge pressing against part of user face, and wherein a sound produced by the user is captured through the distal end and travels into the second and first chamber and is reflected back from the smooth inner wall producing echo sound within the cavity,
   and wherein the distant device is configured to receive the captured audio from the microphone, and record and store the received captured audio.

11. The system of claim 10, wherein the distant device has a display and is programmed with instructions to process the captured audio and determine vocal pitch levels from the captured sound and display such vocal pitch levels on the display of the distant device.

* * * * *